United States Patent [19]

Thomas

[11] Patent Number: 4,549,749
[45] Date of Patent: Oct. 29, 1985

[54] PILLAR INTEGRATED WEB GUIDE

[75] Inventor: Rudy V. Thomas, Sterling Heights, Mich.

[73] Assignee: Allied Corporation

[21] Appl. No.: 536,930

[22] Filed: Sep. 28, 1983

[51] Int. Cl.⁴ .............................................. B60R 21/10
[52] U.S. Cl. ...................................... 280/808; 297/483
[58] Field of Search .............. 280/801, 802, 803, 807, 280/808; 297/483

[56] References Cited

U.S. PATENT DOCUMENTS

| | | | |
|---|---|---|---|
| 3,838,831 | 10/1974 | Bell | 188/139 |
| 3,899,191 | 8/1975 | Royce | 280/803 |
| 3,924,875 | 12/1975 | Lefeuvre | 297/477 |
| 3,959,855 | 6/1976 | Fisher | 24/163 FC |
| 4,027,900 | 6/1977 | Igeta | 280/804 |
| 4,033,594 | 7/1977 | Lindblad | 297/481 |
| 4,130,253 | 12/1978 | Yasumatsu | 297/483 |
| 4,181,326 | 1/1980 | Hollowell et al. | 280/806 |
| 4,231,592 | 11/1980 | Scherenberg et al. | 280/808 |
| 4,264,089 | 4/1981 | Maekawa et al. | 280/803 |
| 4,336,957 | 6/1982 | Schultz et al. | 280/803 |
| 4,360,171 | 11/1982 | Reid et al. | 280/808 |

Primary Examiner—Joseph F. Peters, Jr.
Assistant Examiner—Kenneth R. Rice
Attorney, Agent, or Firm—James R. Ignatowski; Russel C. Wells

[57] ABSTRACT

A web guide for a three point seat belt system integrated into a pillar of an automotive vehicle. The web guide has an annular race disposed in a circular aperture of a hollow vehicle pillar proximate the shoulder height of a seated occupant. A circular web guide member having a transverse web slot receiving the seat belt webbing is rotatably retained in the race. The end of the seat belt webbing external to the pillar is attached to a structural member of the vehicle. The end of the seat belt webbing internal to the hollow pillar is attached to a retractor.

24 Claims, 8 Drawing Figures

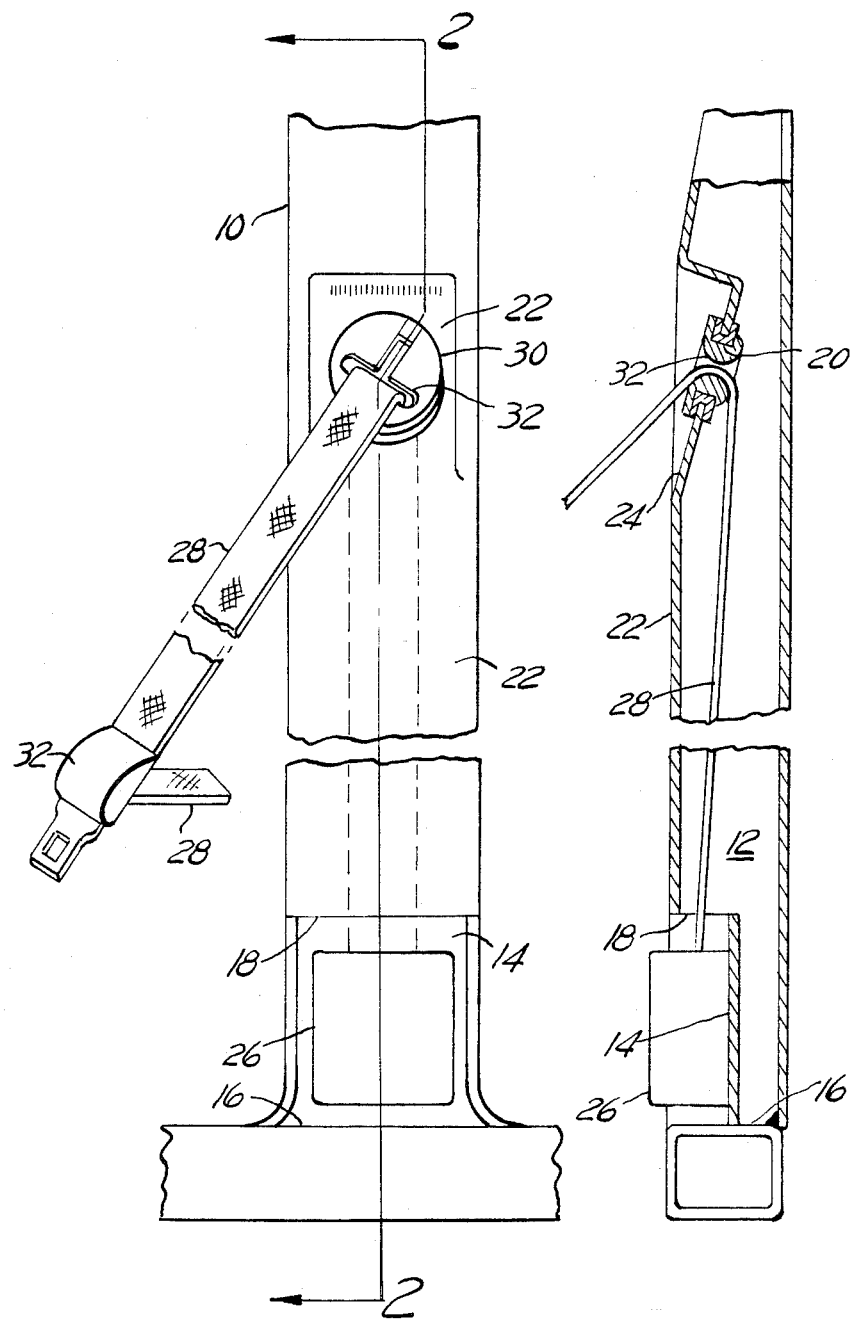

PILLAR INTEGRATED WEB GUIDE

BACKGROUND OF THE INVENTION

The invention is related to three point seat belt systems for automotive vehicles and in particular to a three point seat belt system having a web guide integrated into the vehicle's pillar.

PRIOR ART

Three point seat belt systems are well known in the art. They normally comprise a releasable buckle and connecting tongue connected to a continuous webbing. One end of the webbing is anchored to the vehicle's frame or seat adjacent to the floor and the other end of the webbing is connected to a retractor through a web guide attached to the vehicle's side pillar proximate the shoulder height of a seated occupant. The portion of the webbing between the connecting tongue and the vehicles frame is normally referred to as the lap portion of the webbing and the portion of the continuous webbing between the connecting tongue and the web guide is referred to as the shoulder portion. The web guides currently used in automotive vehicles are a steel swivel bracket bolted to the vehicles side pillar. The problem with this type of web guide is that they intrude upon the interior of the vehicle reducing occupant head room and have a tendency to rattle. Another factor is that the webbing between the web guide and the retractor, is exposed, unsightly and has a tendency to flap in the wind making an irritating noise when the vehicle is driven with the window open. An alternate arrangement is disclosed by Royce in U.S. Pat. No. 3,899,191 in which the web guide and retractor are mounted on the vehicle's door. The three point seat belt system taught by Royce has the web guide integrated into the door mounted arm rest.

In accordance with the invention, the intrusion of the web guide into the interior of the vehicle is virtually eliminated, noise is reduced, and the webbing between the web guide and retractor is concealed inside the pillar.

SUMMARY OF THE INVENTION

The invention is an integrated web guide for a three point safety seat belt system of the type having a retractor mounted to the vehicle's pillar, a buckle anchored to the vehicle's seat or floor proximate the vehicles centerline, and a connecting tongue adjustably attached to a continuous seat belt webbing. One end of the seat belt webbing being anchored to a structural member of the vehicle outboard of the passenger's seat and the other end attached to the retractor through a web guide mounted to the vehicle's pillar proximate the shoulder height of a seated passenger. The integrated web guide assembly characterized by the vehicle's pillar having a circular aperture on its inboard surface proximate the shoulder height of the seated passenger, a retractor well near its base, and a plastic annular face disposed in said circular aperture, said race having a pair of peripheral flanges on opposite sides of said inboard surface and a first portion of a retainer means. A circular web guide is rotatably disposed in said annular race, said web guide having a transverse web slot passing therethrough and a second portion of said retainer means cooperating with said first portion to rotatably retain said circular web guide in said annular race. A continuous webbing passes through the web slot. The end of the webbing external to the pillar is anchored to a structural member of the vehicle outboard of the seat and the end of the webbing internal to the side pillar is attached to the retractor. The adjustable tongue is adjustably connected to the portion of the webbing external to the pillar between said web guide assembly and the end anchored to a structural member of the vehicle.

The advantage of the pillar integrated web guide is that it does not intrude upon the interior of the vehicle, and does not rattle. Another advantage of the pillar integrated web guide is that the portion of the webbing between the web guide and the retractor is concealed behind the inboard surface of the side pillar and cannot flap in the wind when the vehicle is driven with the window open. These and other advantages will become more apparent from reading the specification in conjunction with the accompanying figures.

BRIEF DESCRIPTION OF THE FIGURES

FIG. 1 is a frontal view of an automotive vehicle pillar embodying the pillar integrated web guide.

FIG. 2 is a cross sectional view of the pillar shown in FIG. 1.

DETAILED DESCRIPTION OF THE INVENTION

Figure 3:
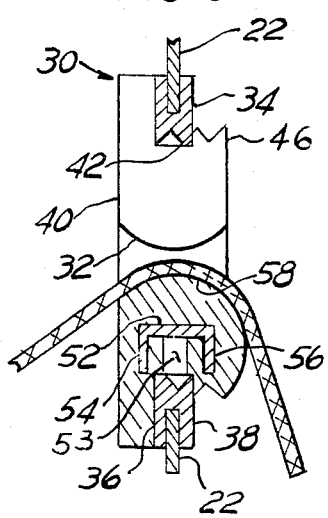
FIG. 3 is an enlarged cross section showing the details of the pillar integrated web guide assembly.

Referring to FIG. 1 and 2 there is shown a frontal and cross sectional view of an automotive vehicle side pillar 10, normally referred to as the "B" pillar in the automotive trade, embodying a pillar integrated web guide assembly 30. The pillar 10 has a hollow interior 12 and a retractor well 14 adjacent to the vehicle's frame 16 having an opening 18 to the hollow interior 12 of the side pillar 10. The web guide assembly 30 is received in a circular aperture 20 passing through the inboard surface 22 of the pillar 10. As shown more clearly in FIG. 2 the inboard surface 22 of the pillar 10 may be indented to form an inclined surface 24 in the vicinity of the circular opening 20 for added structural strength to the pillar about circular opening 20.

A seat belt retractor 26, such as disclosed by Bell in U.S. Pat. No. 3,838,831 is attached to the pillar 10 in retractor well 14. A continuous seat belt webbing 28 has one end attached to the seat belt retractor 26. The other end of the seat belt webbing 28 passes through the hollow interior 12 of the pillar 10, through a slot 32 in the web guide assembly 30 into the interior of the vehicle where it is anchored to a structural member of the vehicle outboard the passenger seat as is known in the art. An adjustable tongue 32 which connects to a seat belt buckle (not shown) is slidably attached to the seat belt webbing 28 intermediate the web guide assembly 30 and the point at which the seat belt webbing is attached to the vehicle's structural member.

The details of the web guide assembly 30 are shown in FIGS. 3 through 7. Referring first to FIG. 3 there is shown an enlarged cross section of the web guide assembly 30. The web guide 30 comprises a plastic race 34 having a pair of peripheral flanges 36 and 38 captivating the inboard surface 22 of the side pillar 10 about the periphery of circular aperture 20 and a circular web guide 40 received in the central aperture 42 of the race 34. The circular web guide 40 has the transverse web slot 32 passing therethrough, a front flange 44, a rear flange 46 and an intermediate undercut section 48 as more clearly shown in FIGS. 4 and 5. The periphery of rear flange 46 and central aperture 42 of race 34 have mating threads which permit the circular web guide 40 to be threaded onto the race 34. When fully received in race 34 the threaded portion of the circular web guide's rear flange disengages from the threaded portion of the race's central aperture 42 and the circular web guide 40 is free to rotate within the central aperture 42 with the undercut section 48 interfacing the threaded portion of the central aperture 42. The diameter of the undercut section 48 is approximately equal to the minor diameter of the threaded portion of rear flange 46 so that the undercut section 48 bears on the threaded portion of the central aperture 42 with minimal clearance.

The pitch of the threaded portions of rear flange 46 and central aperture 42 are selected so that upon assembly the threaded portion of rear flange 46 will dissengage the threaded portion of the central aperture 42 with one full turn or less of the circular web guide 40.

The circular web guide 40 also has an entrance slot 50 disposed normal to web slot 32 and connected thereto. Entrance slot 50 is used to insert the seat belt webbing 28 into the web slot 32 prior to threading the circular web guide 40 onto the race 34. Upon assembly, the webbing 28 is inserted edgewise into entrance slot 50 and guided into web slot 32. The circular web guide 40 with the webbing 28 in web slot 32 is rotated through an appropriate angle counter to the direction required to thread circular web guide 40 onto race 34. The circular web guide 40 is then threaded onto race 34 unwinding the twisted portion of webbing 28 both interior and exterior to the side pillar 10. Entrance slot 50 permits the circular web guide 40 to be attached to the seat belt webbing without having to detach the webbing 28 from the retractor 26 or the fitting (not shown) which is anchored to the vehicle's structural member.

Figure 4:
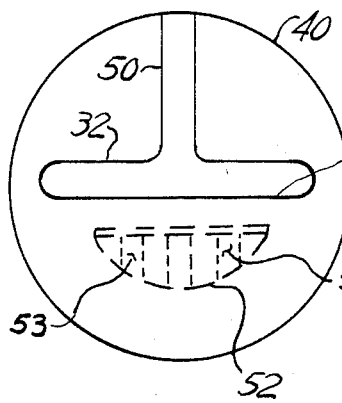
FIG. 4 is a frontal view of the circular web guide.
Figure 5:
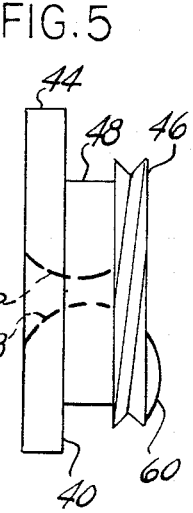
FIG. 5 is a side view of the circular web guide.

To provide additional strength 30 to the wide guide assembly a steel reinforcement member 52 is molded into the lower portion of circular web guide 40. As shown in FIG. 3 and 4, reinforcement member 52 has two downwardly directed half moon shaped flanges 54 and 56 which engage the edge of aperture 20 formed in the inboard surface 22 of the side pillar when the portion of the web guide 40 under reinforcement member 52 fails under compressive loads resulting from a crash. Accordingly the portion of the web guide 40 under reinforcement member 52 is weakened, for example by providing at least one or more relief bores 53 under reinforcement member 52. This assures that the portion of the web guide under reinforcement member 52 will fail first under crash conditions.

The circular web guide 40 may also have a contoured projection 60 protruding beyond rear flange 46 increasing the length of bearing surface 58 and providing additional structural length to the pillar integrated web guide above reinforcement member 52.

Figure 6:
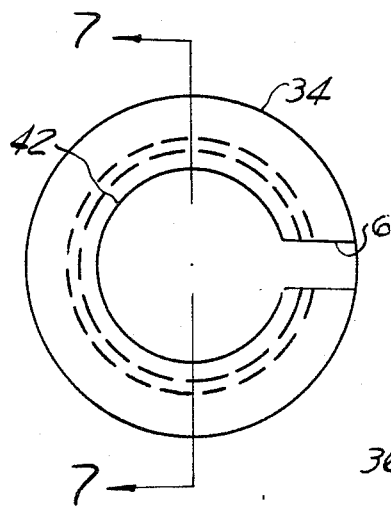
FIG. 6 is a front view of the race.
Figure 7:
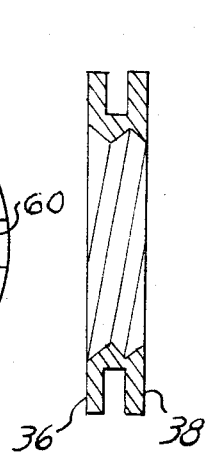
FIG. 7 is a cross sectional view of the race.
Figure 8:
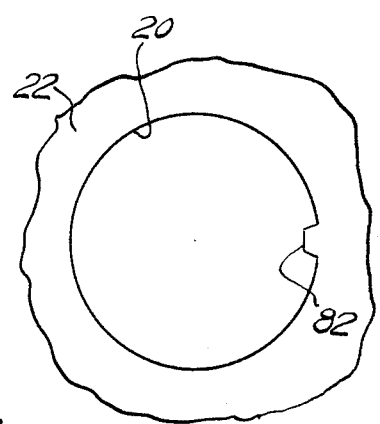
FIG. 8 is a front view of the circular aperture in the vehicle's pillar showing tab 82.

The details of the race 34 are shown in FIGS. 6 and 7. The race 34 has a generally annular form having two peripheral flanges 36 and 38 as previously described. The central aperture 42 of race 34 is threaded to receive the threaded portion of the circular web guide's rear flange 46. A slot 60 is cut through one side of race 34 permitting the race to be partially collapsed for insertion into circular aperture 20 of the pillar's inboard surface 22. To prevent the race 34 from rotating in circular aperture 20, aperture 20 may include a tab 82 mating with slot 80. The tab 82 may be an inwardly directed radial tab 82 as shown FIG. 8 or be bent internal to side pillar 10 and engage peripheral flange 38 of race 34.

It is not intended that the integral web guide be limited to the configuration discussed in the specification and shown on the accompanying figures and may be embodied in a comparable pillar associated with the vehicle's rear seats as well as the front seats. It is recognized that one skilled in the art can make changes to the individual components without departing from the spirit of the invention.

Having thus described the invention what is claimed is:

1. An integrated web guide for a three point seat belt system of an automotive vehicle having a buckle mounted to a structural member of the vehicle, an adjustable tongue attached to a continuous seat belt webbing, one end of the webbing attached to another structural member of the vehicle and the other end connected to a retractor, characterized by:
   a hollow vehicle pillar having a circular aperture through its inboard surface proximate the shoulder height of a seated occupant and a retractor well at its base;
   an annular race disposed in said circular aperture, said race having a first portion of a retaining means, a radical slot, and a pair of peripheral flanges circumscribing said circular aperture on opposite sides of said inboard surface:
   a circular web guide rotatably disposed in said annular race, said web guide having a web slot passing therethrough and a second portion of said retaining means cooperating with said first portion to rotatably retain said web guide in said race, said web slot having a contoured lower bearing surface;
   a webbing retractor attached to said pillar in said retractor well, said webbing retractor including a continuous webbing passing through said web slot, said webbing having a first portion external to said pillar, the end of said first portion anchored to a structural member of the vehicle and a second portion internal to said pillar, the end of said second portion attached to said webbing retractor; and
   an adjustable tongue connected to said first portion of said webbing between said web guide and said end anchored to a structural member of the vehicle, said adjustable tongue adapted to be connected to the buckle.

2. The integrated web guide of claim 1 wherein said race and said web guide are made from structural plastic.

3. The integrated web guide of claim 2 wherein said web guide has a reinforcement member.

4. The integrated web guide of claim 3 wherein said reinforcement member has at least one downwardly projecting flange.

5. The integrated web guide of claim 4 wherein said reinforcement member is a steel member having a pair of downwardly projecting flanges, one on either side of the inboard surface of said pillar.

6. The integrated web guide of claim 3 wherein said web guide has a radial entrance slot normal to and intercepting said web slot.

7. The integrated web guide of claim 1 wherein said web guide has a external peripheral flange larger than the internal diameter of said race, an internal peripheral flange larger than the internal diameter of race and an intermediate undercut section having a width approximately equal to the width of said race and an external diameter slightly smaller than the internal diameter of said race.

8. The integrated web guide of claims 6 or 7 wherein said web guide has a contoured projection protruding from said web guide into said hollow side pillar increasing the length of said bearing surface of said web slot.

9. The integrated web guide of claims 6 or 7 wherein said first and second portions of said retaining means are mating threads, one on the internal diameter of said race and a second on external diameter of said internal flange respectively.

10. The integrated web guide of claim 9 wherein the pitch of said mating threads is selected so that said mating threads will disengage within on full revolution of said web guide relative to said race.

11. The integrated web guide of claim 1 wherein said circular aperture has a tab mating with said radial slot, said tab engaging said race and preventing the rotation of said race in said circular aperture.

12. The integrated seat belt system of claim 1 wherein the inboard surface of the vehicle's side pillar is indented about the periphery of said circular aperture.

13. A web guide for a three point seat belt system for an automotive vehicle having a hollow pillar, a circular aperture formed through the inboard surface of the pillar proximate the shoulder height of a seated occupant, and a seat belt retractor attached to the pillar, the seat belt retractor having a seat belt webbing passing through the interior of the hollow pillar and through the circular aperture into the interior of the vehicle, said web guide comprising:
   an annular race disposed in the circular aperture, said annular race having a pair of peripheral flanges circumscribing said circular aperture on opposite sides of said inboard surface and a radial slot therethrough;
   a circular web guide assembly rotatably disposed in said race, said web guide having a web slot receiving said seat belt webbing therethrough and, said web slot having a contoured lower bearing surface; and
   means for retaining said web guide in said race.

14. The web guide of claim 13 wherein said race and web guide member are made from structural plastic.

15. The web guide of claim 14 wherein said web guide member has an external peripheral flange having a diameter approximately equal to the diameter of said race and an undercut section having a diameter rotatably received in the internal diameter of said race.

16. The web guide of claim 15 wherein said web guide member has a reinforcement member.

17. The web guide of claim 16 wherein said reinforcement member has at least one downwardly projecting flange.

18. The web guide of claim 17 wherein said reinforcement member is a steel member having a pair of downwardly projecting flanges one disposed on either side of said inboard surface of said pillar.

19. The web guide of claim 16 wherein said web guide member has a radial entrance slot normal to said web slot and intercepting said web slot.

20. The web guide of claim 15 or 19 wherein said web guide member has a contoured projection protruding from web guide member into the hollow pillar increasing the width of the contoured bearing surface of said web slot.

21. The web guide of claims 15 or 19 wherein said web guide member has an internal peripheral flange interfacing the surface of said race internal to the hollow side pillar, said means for retaining are mating threaded portions of the internal diameter of said race and the external portion of said internal peripheral flange respectively.

22. The web guide of claim 13 wherein said circular aperture has a tab mating with said radial slot, said tab engaging said race and preventing the rotation of said race in said circular aperture.

23. The web guide of claim 13 wherein said web guide member has an internal peripheral flange adjacent to the surface of said race internal to the pillar said means for retaining are mating threaded portions of the internal diameter of said race and the external portion of said internal peripheral flange respectively.

24. The web guide of claim 13 wherein the inboard surface of the vehicle's pillar is indented about the periphery of said circular aperture.

* * * * *